3,086,043
ALKENYLSUCCINIC ANHYDRIDE MONOESTERS OF SULFOALKYL DERIVATIVES

Van R. Gaertner, Dayton, Ohio, assignor to Monsanto Chemical Company, St. Louis, Mo., a corporation of Delaware
No Drawing. Filed Dec. 21, 1959, Ser. No. 860,644
12 Claims. (Cl. 260—485)

This invention relates to the preparation of new ester sulfonate compounds. More particularly, this invention relates to hydroxyalkane- and hydroxypolyalkenoxyalkanesulfonate derivatives of alkenylsuccinic anhydrides and salts thereof.

It is an object of this invention to provide new and useful compounds of the sulfoalkyl and sulfopolyalkenoxyalkyl alkenylsuccinic acid type. Within the purview of my invention are compositions having high surface activity comprising the compounds of my present invention, namely, the salts of sulfoalkyl and sulfopolyalkenoxyalkyl alkenylsuccinic acids. Still another object of this invention is to provide a novel process of preparation of these new sulfoalkyl and sulfopolyalkenoxyalkyl alkenylsuccinic acids and their various salts. It is yet another object of my invention to prepare new sulfoalkyl and sulfopolyalkenoxyalkyl alkenylsuccinic acids and salts thereof, having high efficiency as lathering agents, wetting out agents, and as detergents.

According to this invention, new compounds are prepared by the reaction of alkenylsuccinic anhydride compounds of the general formula

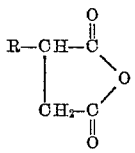

where R is an alkenyl radical having from 8 to 20 carbon atoms, preferably of the branched chain type, with hydroxyalkane- or hydroxypolyalkenoxyalkanesulfonate compounds having the formula

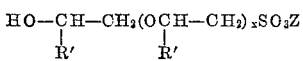

wherein R' is a lower alkyl radical having from 1 to 4 carbon atoms or hydrogen, $x$ is a number of from 0 to 3, and Z is a salt forming cation.

The alkenylsuccinic anhydride reactants can be prepared by reacting an olefin having from 8 to 20 carbon atoms with maleic anhydride. Examples of olefins which are preferred for making the alkenylsuccinic anhydride reactants are the $C_9$–$C_{18}$ branched chain smaller olefin polymers such as triisobutylene, tetrapropylene, tetraisobutylene, pentapropylene, hexapropylene, pentaisobutylene, etc. Also included are the straight chain olefins such as 1-octene, 1-nonene, 5-decene, 6-undecene, 1-dodecene, 8-pentadecene, 9-octadecene, 1-eicosene, etc. Lower molecular weight olefin polymers having both non-terminal double bonds and branched chains, may also be used. Likewise included are olefin materials having ester functions therein such as the lower alkyl esters of higher unsaturated fatty acids, e.g., methyl oleate, ethyl linoleate, propyl ricinoleate, etc. When olefins having non-terminal double bonds are used, there may be present in the reaction medium, isomeric mixtures of alkenylsuccinic anhydrides due to the shifting of the double bond and attachment of the olefin to the succinic acid through either of the two carbon atoms of the original double bonds. The presence of an isomeric mixture of alkenylsuccinic anhydrides is not detrimental in practical application for the isomers are so closely related that they possess substantially the same utility.

The hydroxyalkanesulfonate and hydroxypolyalkenoxyalkanesulfonates which are used in the preparation of the compounds of this invention are generally made by reacting a bisulfite with olefin epoxides having from 2 to 4 carbon atoms. If an excess of the olefin epoxide is used additional alkenoxy groups, i.e.,

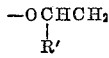

add into the molecule, the number of such groups in the molecule being dependent upon the moles of olefin epoxide used. Preferably for this invention, the number of such groups in the hydroxyalkenoxyalkanesulfonate reactant does not exceed 4. A few examples of such reactants are the alkali metal and alkaline earth metal, including magnesium salts, of:

2-hydroxyethanesulfonic acid (sodium isethionate),
2-hydroxy-1-propanesulfonic acid,
2-hydroxy-1-hexanesulfonic acid,
2-(2-hydroxyethoxy)ethanesulfonic acid,
2-(2-hydroxy-1-butoxy)-1-butanesulfonic acid,
2-[2-(2-hydroxy-1-pentoxy)-1-pentoxy]-1-pentanesulfonic acid,
{2-[2-(2-hydroxy-1-propoxy)-1-propoxy]-1-propoxy}-1-propane-sulfonic acid,
{2-[2-(2-hydroxyethoxy)ethoxy]ethoxy}ethanesulfonic acid.

Reaction of the alkenylsuccinic anhydride compound with the hydroxyalkane- or the hydroxypolyalkenoxyalkanesulfonate gives the presently provided carboxy group-containing surface active agents, i.e., compounds of the general formula

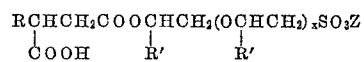

where R, R', $x$, and Z are as defined above.

The reaction for the preparation of the new compounds of my invention can be represented by the equation

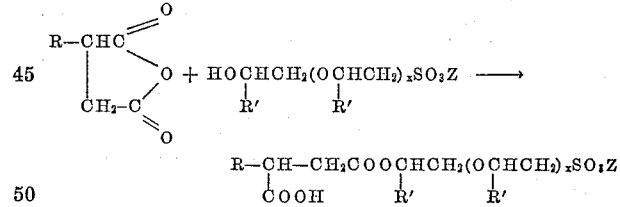

wherein R, R', $x$ and Z are as defined above. The reaction is a straight addition reaction with no by-product being formed. Usually an excess of the hydroxyalkane- or hydroxypolyalkenoxyalkanesulfonate is used to insure complete reaction of the anhydride, the excess being easily removed by known chemical means.

I have named the compounds of this invention as esters of succinic acid with the esterified carboxyl group of the succinic acid being number 1 carbon, and the free carboxyl group of the succinic acid being termed number 4 carbon. For example,

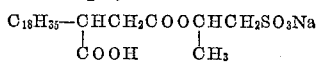

is sodium O-mono(1-sulfo-2-propyl)-3-octadecenylsuccinate.

A few examples of compounds of this invention prepared by the method described above are:

O-mono(2-sulfoethyl)-3-triisobutenylsuccinate,
O-mono[1-(1-sulfo-2-propoxy)-2-propyl]-3-tetraisopropenylsuccinate, O-mono{1-[1-(1-sulfo-2-butoxy)-2-butoxy]-2-butyl}-3-pentapropenylsuccinate,
O-mono[1-(1-sulfo-2-pentoxy)-2-pentyl]-3-(1-decenyl)succinate,
O-mono{1-[1-1(1-sulfo-2-hexyloxy)-2-hexyl]-2-hexane}-3-(1-hexadecenyl succinate,
O-mono(2-{2-[2-(sulfotthoxy)ethoxy]ethoxy}ethyl-3-pentaisobutenylsuccinate,
O-mono{1-[1-(1-sulfo-propoxy)-2-propoxy]-2-propyl}-3-(1-dodecenyl)succinate,
O-mono(1-sulfo-2-butyl)-3-(1-octadecenyl)succinate,
O-mono(1-{1-[1-(1-sulfo-2-pentoxy)-2-pentoxy]-2-pentoxy}-2-pentyl-3-(1-nonenyl)succinate,
O-mono{1-[1-(1-sulfo-2-hexyloxy)-2-hexloxy]-2-hexyl}-3-(1-eicosenyl)succinate, and
O-mono(1-{1-[1-(1-sulfo-2-propoxy)-2-propoxy]-2-propyl}-3-(1-tetradecenyl)succinate, wherein the sulfo group is neutralized with a salt-forming cation such as alkali metal, alkaline earth metal. Ammonium and aliphatic amine salts can also be made, if desired, by reacting the alkali metal salt of the above named compounds with ammonium chloride or a dialkylamine hydrochloride.

The sulfoalkyl and sulfoalkenoxyalkyl alkenylsuccinates of this invention have exceptional surface active properties, particularly in the general field of detergents, wetting agents, and lathering agents.

Reaction of the hydroxyalkane- or hydroxyalkenoxyalkanesulfonate with the alkenylsuccinic anhydride takes place readily by contacting the sulfonate compound with the alkenylsuccinic anhydride in a neutral or alkaline solution, advantageously in the presence of a basic catalyst, and in an inert diluent and allowing the reaction mixture to stand until the desired product has been formed. Optimum yields are obtained by operating at moderately increased temperatures, say, at temperatures of from 75° C. to 100° C. The most useful basic catalysts are the tertiary amines such as pyridine, and triethylamine. The preferred inert diluents to be used are nonreactive solvent materials such as the dialkylformamides and diacyl sulfoxides of which dimethylformamide and dimethyl sulfoxide are simple examples. Other inert diluents that may be used are aliphatic and aromatic hydrocarbons such as toluene or hexane, and ethers such as isopropyl ether or dioxane.

The alkenylsuccinic anhydride reaction with the hydroxyalkane or hydroxyalkenoxyalkanesulfonate compounds takes place by addition of one component to the other so there is no formation of by-product. When the reactants are used in substantially equimolar proportions and reaction is effected in the absence of a diluent, the reaction product may be used directly for a variety of industrial purposes. When the reaction is effected in the presence of a diluent, the reaction product comprises a solution of the surface active agent in the diluent. The diluent, as well as any unreacted or excess hydroxyalkanesulfonate, is separated from the reaction mixture by customary isolation procedures, e.g., by distillation, solvent extraction, filtration, etc.

The present compounds of my invention are stable, usually water soluble, viscous liquid or resinous materials. They are advantageously employed for a variety of industrial and agricultural purposes and are particularly valuable as surfactants. Some of these compounds possess biological toxicant properties. Some of these compounds are particularly good wetting, emulsifing, frothing, penetrating, and lathering agents. They also have good detergent and lime soap dispersion properties.

Other valuable uses are in metal cleaning compositions, dry cleaning compositions, additives for rubber latices, additives for road building materials as air entraining agents for concrete or cement, additives to asphalt compositions, also useful as disinfectants, insecticides, moth proofing agents, bactericides, fungicides, herbicides.

In order to illustrate some of the various aspects of the invention and to serve as a guide in applying the invention the following specific examples are given. It will, of course, be understood that variations from the particular temperatures, diluents or solvents, proportions etc., can be made without departing from the invention.

*Example 1*

A mixture consisting of 29.2 g. (0.20 mole) of sodium isethionate, 200 ml. of dimethylformamide and 26.6 g. (0.10 mole) of triisobutenylsuccinic anhydride, and 2 g. of pyridine was heated to from 65° C. to 80° C., while stirring, for a period of 18.5 hours. During the heating period 10 ml. more of pyridine was added when the temperature reached 80° C. At the end of the heating period the reaction mixture was cooled to room temperature, filtered to remove solids and extracted with hexane to remove oil impurities. The mixture was distilled to remove the dimethylformamide and then the residue was completely dissolved in ethyl alcohol, and treated with charcoal to decolorize the solution. After filtering off the charcoal, the reaction mixture was distilled to a pot temperature of 100° C./1 mm. to obtain an amber brittle resin, sodium O-mono(2-sulfoethyl)-3-triisobutenylsuccinate, which analyzed as follows:

|  | Found | Calcd. $C_{18}H_{31}O_7SNa$ |
| --- | --- | --- |
| Percent C | 54.02 | 52.1 |
| Percent H | 7.94 | 7.93 |
| Percent S | 6.59 | 7.52 |

*Example 2*

A mixture of 21.9 g. (0.15 mole) of sodium isethionate, 100 ml. of dimethylformamide, 26.6 g. (0.10 mole) of tetrapropenylsuccinic anhydride, and 5 ml. of pyridine was heated and stirred, as in Example 1, at a temperature of 70 to 80° C. After the heating period the mixture was cooled, and filtered to remove the excess insoluble sodium isethionate. The filter cake was rinsed with dimethylformamide, and then the dimethylformamide was removed by vacuum distilling at a temperature not greater than 100° C./.1 mm. leaving 39.2 g. (94.5% yield) of sodium O-mono(2-sulfoethyl)-3-tetrapropenylsuccinate, which analyzed as follows:

|  | Found | Calcd. $C_{18}H_{31}O_7SNa$ |
| --- | --- | --- |
| Percent C | 53.54 | 52.1 |
| Percent H | 8.17 | 7.53 |
| Percent S | 6.85 | 7.72 |

This material has excellent lather and detergency characteristics.

*Example 3*

A mixture of 21.9 g. (0.15 mole) of sodium isethionate, and 26.6 g. of mixed $C_{10}$–$C_{12}$ olefin (Solvay ASA) succinic anhydrides in 100 ml. of dimethylformamide and 20 ml. of pyridine was stirred and heated for 11 hours at a temperature of 89 to 90° C., and then cooled overnight. The excess sodium isethionate was removed by filtration. The dimethylformamide solvent was removed by distillation as in the previous examples and the residue was dissolved in isopropyl alcohol and decolorized with charcoal with heating. The charcoal was removed by filtering the solution with the help of a filter aid. Then the isopropyl alcohol solvent was removed by distillation leaving 30.5 g. of a rather dark amber resinous product, sodium O-mono(2-sulfoethyl)-3-alkenylsuccinate.

*Example 4*

To 15.4 g. (0.05 mole) pentadecenylsuccinic anhydride, prepared by heating a mixture of pentadecene (propylene pentamer) with maleic anhydride, was added 14.8 g. of sodium isethionate in 100 ml. of dimethylformamide with 10 ml. of pyridine. The resulting mixture was heated and stirred for 15 and one-half hours at a temperature of 80 to 92° C. After cooling the reaction mixture to room temperature, the excess sodium isethionate was filtered off and the filtrate was extracted with hexane to remove oils using methyl alcohol to break up emulsions. The dimethylformamide solvent was removed by heating the mixture under aspirator vacuum, and the residue was dissolved in isopropyl alcohol and decolorized with charcoal as in the previous example. After filtering off the charcoal, the isopropyl alcohol solvent was distilled off at 90° C./.1 mm., leaving as a residue 16.3 g. (71.7% yield) of a very sticky, viscous, reddish-brown gum, sodium O-mono(2-sulfoethyl)-3-pentapropenylsuccinate.

*Example 5*

A 10.2 g. (0.100 mole) portion of sodium formaldehyde bisulfite, $HOCH_2SO_3Na$, was mixed with 26.6 g. (0.100 mole) of tetrapropenylsuccinic anhydride in 50 ml. of dimethylformamide and 5 ml. of pyridine. The resulting mixture was stirred and heated at from 89° C.–121° C. for approximately 7½ hours. Another 10-ml. portion of pyridine was added and the mixture was heated further at 115°–120° C. for 7½ more hours. Then the reaction mixture was cooled and extracted twice with hexane. The dimethylformamide layer was evaporated to dryness at <100° C. first at the aspirator and finally at 0.5 mm. vacuum, leaving 33.0 g. (89.7% yield) of a dark amber gum, sodium O-mono(sulfomethyl)-3-tetrapropenylsuccinate.

*Example 6*

A 19.2 g. (0.10 mole) portion of sodium diethylene glycol sulfonate, $(HOC_2H_4OC_2H_4SO_3Na)$, and 26.6 g. of tetrapropenylsuccinic anhydride were mixed in 100 ml. of dimethylformamide with 10 ml. of pyridine. The mixture so obtained was heated for approximately 5 hours at 90 to 105° C. while stirring. After cooling the reaction mixture to 25° C. it was filtered with "Hyflo Super Cel" (a filter aid) to remove solids which were washed twice with dimethylformamide and discarded. The filtrate was evaporated to near dryness to a final pot temperature of 100°/0.1 mm. to remove the dimethylformamide diluent, leaving 43.2 g. (94% yield) of a light amber, semi-gum (fluid when hot), sodium O-mono[2-(2-sulfoethoxy)ethyl]-3-tetrapropenylsuccinate.

*Example 7*

To 19.2 g. (0.10 mole) of sodium diethylene glycol sulfonate in 100 ml. of dimethylformamide and 10 ml. of pyridine was added 35.1 g. (0.10 mole) of octadecenylsuccinic anhydride and the resulting mixture was stirred and heated for 95 minutes. After cooling overnight, a solid which had separated was filtered off using a filter aid. The cake was rinsed with dimethylformamide to remove any absorbed product, and then the cake was discarded. The filtrate, a dimethylformamide solution of the product, was evaporated to 100° C. under aspirator pressure and then under 0.1 mm. vacuum pressure to remove the dimethylformamide solvent, leaving 42.9 g. (79.0% yield) of a dark amber, semi-fluid product which turned to a brittle solid at room temperature. The product was sodium O-mono[2-(2-sulfoethoxy)ethyl]-3-octadecenylsuccinate.

In a test taken from Detergency, Evaluation and Testing, by J. C. Harris (Interscience), pp. 92–97 using Gardinol ("Duponol WA"—Dupont—essentially lauryl sulfate) as the standard detergent, this product was 86% as effective a detergent as Gardinol in water of 50 p.p.m. hardness and was 108% as effective as Gardinol in water of 300 p.p.m. hardness.

*Example 8*

A 19.2 (0.10 mole) portion of sodium diethylene glycol sulfonate and 26.6 g. (0.10 mole) of triisobutenylsuccinic anhydride were mixed in 100 ml. of dimethylformamide and 10 ml. of pyridine. The mixture was heated for 90 minutes while stirring to facilitate the reaction. The reaction mixture was cooled and filtered with Hyflo to remove suspended solid, and the filtrate was evaporated as in the prior examples to obtain 39.2 g. (87.4% yield) of an amber resinous product, sodium O-mono-[2-(2-sulfoethoxy)ethyl]-3-triisobutenylsuccinate.

*Example 9*

A 26.6 g. portion of a mixed $C_{10}$–$C_{12}$-alkenylsuccinic anhydride (Solvay ASA) and 28.8 g. (0.15 mole) of sodium diethylene glycol sulfonate in 100 ml. of dimethylformamide and 10 ml. of pyridine were mixed, stirred, and heated 3 hours to from 98–101° C. to facilitate reaction. After cooling overnight, 100 ml. of isopropyl alcohol was added to precipitate the excess sulfonate reactant, which was filtered and washed with an isopropyl alcohol-dimethylformamide mixture. The filtrate was evaporated to dryness to approximately 120° C./1 mm. leaving 43.5 g. (95% yield) of an amber gum sodium O-mono[2-(2-sulfoethoxy)ethyl]-3-$C_{10}$–$C_{12}$ alkenylsuccinate, which is completely water soluble and high foaming.

*Example 10*

The superiority of the compounds of my invention as wetting agents was shown when these products were evaluated for wetting efficiency as determined by the Draves Wetting Test of American Association of Textile Chemists. The following wetting times in seconds were measured at the indicated concentrations.

| Product of— | Speed of Wetting, sec. at percent concentration | | | |
|---|---|---|---|---|
| | 0.5 | 0.25 | 0.125 | 0.062 |
| Example 1 | [1] Inst. | 5.6 | 180+ | |
| Example 2 | [1] Inst. | 3.0 | 20.5 | 180+ |
| Example 3 | 3.8 | 7.3 | 28.2 | 180+ |
| Example 4 | 4.1 | 7.6 | 11.3 | 27.7 |
| Example 6 | 1.9 | 4.5 | 33.0 | 180+ |
| Example 8 | 2.3 | 5.0 | 51.7 | 180+ |

[1] Inst.=instantaneous.

*Example 11*

Products of my invention can find wide applications where a high level of foaming or sudsing activity is demanded, e.g., shampoos, liquid washing compositions, shaving creams, etc. The Ross-Miles Lather Test of the American Society for Testing Materials was used to evaluate the lathering activity of these compounds. The following results were obtained in water of the indicated hardness:

| Product of— | Lather Heights, cm. | | | |
|---|---|---|---|---|
| | 50 p.p.m. | | 300 p.p.m. | |
| | at once | 5 minutes | at once | 5 minutes |
| Example 2 | 18.5 | 11.5 | 22.2 | 19.5 |
| Example 3 | 18.2 | 17.6 | 21.4 | 20.2 |
| Example 6 | 16.5 | 16.0 | 18.4 | 5.8 |
| Example 8 | 12.1 | 7.3 | 14.5 | 2.7 |
| Example 9 | 18.5 | 18.5 | 19.0 | 19.0 |

I claim:
1. Compounds of the formula

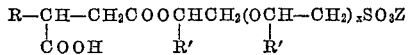

wherein R is an alkenyl radical having from 8 to 20 carbon atoms, R' is selected from the group consisting of hydrogen and alkyl radicals having from 1 to 4 carbon atoms, Z is a salt forming cation selected from the group consisting of alkali metal and alkaline earth metal, and $x$ is an integer of from 0 to 3.

2. Compounds of the formula $$Y-\underset{\underset{COOH}{|}}{CH}-CH_2COO\underset{\underset{R'}{|}}{CH}CH_2(O\underset{\underset{R'}{|}}{CH}CH_2)_xSO_3Z$$

wherein Y is selected from the group consisting of triisobutenyl, tetraisobutenyl, tripropenyl, and tetrapropenyl radicals, R' is selected from the group consisting of hydrogen and lower alkyl radicals having from 1 to 4 carbon atoms, Z is a salt forming cation selected from the group consisting of alkali metal and alkaline earth metal, and $x$ is an integer of from 0 to 3.

3. Sodium O-mono(2-sulfoethyl) - 3 - triisobutenylsuccinate.

4. Sodium O-mono(2 - sulfoethyl)-3-tetrapropenylsuccinate.

5. Sodium O-mono(2 sulfoethyl)-3-($C_{10}$–$C_{15}$)-alkenylsuccinate.

6. Sodium O-mono(2 - sulfoethyl)-3-pentapropenylsuccinate.

7. Sodium O-mono[2-(2-sulfoethoxy)ethyl]-3-tetrapropenylsuccinate.

8. Sodium O-mono[2 - (2 - sulfoethoxy)ethyl]-3-octadecenylsuccinate.

9. Sodium O-mono-[2-(2 - sulfoethoxy)ethyl]-3-triisobutenylsuccinate.

10. Sodium O-mono-[2-(2-sulfoethoxy)ethyl]-3-($C_{10}$–$C_{12}$)alkenylsuccinate.

11. Sodium O-mono(sulfomethyl)-3-tetrapropenylsuccinate.

12. Compounds having a formula selected from the group consisting of $$R-\underset{\underset{COOH}{|}}{CH}CH_2COOCH_2SO_3Z$$

and $$R-\underset{\underset{COOH}{|}}{CH}CH_2COOCH CH_2(O\underset{\underset{R'}{|}}{CH}-CH_2)_xSO_3Z$$

wherein R is an alkenyl radical having from 8 to 20 carbon atoms, R' is selected from the group consisting of hydrogen and alkyl radicals having from 1 to 4 carbon atoms, Z is a salt forming cation selected from the group consisting of alkali metal and alkaline earth metal, and $x$ is an integer of from 0 to 3.

References Cited in the file of this patent

UNITED STATES PATENTS

| | | |
|---|---|---|
| 2,832,795 | Hempel et al. | Apr. 29, 1958 |
| 2,950,310 | Kirkpatrick | Aug. 23, 1960 |

FOREIGN PATENTS

| | | |
|---|---|---|
| 787,138 | Great Britain | Dec. 4, 1957 |